United States Patent

Maheshwari et al.

[11] Patent Number: 5,920,860
[45] Date of Patent: Jul. 6, 1999

[54] METHOD AND APPARATUS FOR ACCESSING OF LARGE OBJECT DATA SEGMENTS FROM A REMOTE DATABASE

[75] Inventors: Hemant Maheshwari; Tina Louise Mukai, both of San Jose; Steven John Watts, Morgan Hill, all of Calif.

[73] Assignee: International Business Machines Corporation, Armonk, N.Y.

[21] Appl. No.: 08/931,002

[22] Filed: Sep. 15, 1997

[51] Int. Cl.[6] .................................................. G06F 17/30
[52] U.S. Cl. ...................................... 707/5; 707/2; 707/10
[58] Field of Search ....................................... 707/5, 2, 10

[56] References Cited

U.S. PATENT DOCUMENTS

| | | | |
|---|---|---|---|
| 5,517,605 | 5/1996 | Wolf | 395/200.6 |
| 5,566,329 | 10/1996 | Gainer et al. | 707/4 |
| 5,600,831 | 2/1997 | Levy et al. | 707/2 |
| 5,623,652 | 4/1997 | Vora et al. | 707/10 |
| 5,625,818 | 4/1997 | Zarmer et al. | 707/104 |
| 5,675,721 | 10/1997 | Freedman et al. | 345/502 |
| 5,701,451 | 12/1997 | Rogers et al. | 707/1 |
| 5,708,825 | 1/1998 | Sotomayor | 707/501 |
| 5,712,979 | 1/1998 | Graber et al. | 395/200.54 |
| 5,748,954 | 5/1998 | Mauldin | 707/10 |

OTHER PUBLICATIONS

IBM Technical Disclosure Bulletin, vol. 31, No. 5, Oct. 1988, pp. 301–303, "Interpretive Database Merge Join Operation".

*Primary Examiner*—Wayne Amsbury
*Attorney, Agent, or Firm*—Ohlandt, Greeley, Ruggiero & Perle

[57] ABSTRACT

A method enables a computer to manipulate data from a table in a remote database in accord with a query from a query requestor, wherein at least some data in the table includes large data objects (LOBs). The method includes the steps of: responding to the query by configuring a database query and determining (i) if a response to the database query requires transfer of LOB data from the table and if yes, and (ii) the LOB data can be transferred in response to the database query without a data manipulation which uses the LOB data or (iii) a data manipulation required in response to the database query which uses the LOB data can be performed at the remote database, then designating the LOB data for "streaming"; dispatching the database query to the remote database and receiving a result set from the table from the remote database in response to the query; and storing the result set and causing any LOB data which has been marked for streaming to be then dispatched to the query requestor without being written to disk.

8 Claims, 3 Drawing Sheets

QUERY PROCESSING (RUN TIME)

O_EMPLOYEE

| ROW # | EMPNUM | EMPNAME | PICTURE |
|---|---|---|---|
| 1 | 101 | TOM | <1 MB> |
| 2 | 102 | JACK | <0.8 MB> |
| 3 | 103 | JILL | <2 MB> |
| 4 | 104 | JEAN | <1.5 MB> |
| 5 | 105 | BILL | <50 MB> |

<1.5 MB> DENOTES AN IMAGE FILE OF 1.5 MB

METHOD AND APPARATUS FOR ACCESSING OF LARGE OBJECT DATA SEGMENTS FROM A REMOTE DATABASE

CROSS-REFERENCE TO RELATED PATENT APPLICATIONS

This Application is related to the following co-pending patent applications:

"HETEROGENEOUS DATABASE SYSTEM WITH DATA SOURCE EXTENSIBILITY", Inventor(s): Kleewein et al., U.S. Ser. No. 08/929,809, now pending;

"SYSTEM AND METHOD FOR PROVIDING A SINGLE APPLICATION PROGRAM INTERFACE FOR HETEROGENEOUS DATABASES", Inventor(s): Kleewein et al., U.S. Ser. No. 08/931,008, now pending;

"METHOD AN APPARATUS FOR OPTIMIZING QUERIES ACROSS HETEROGENEOUS DATA BASES", Inventor(s): Kleewein et al., U.S. Ser. No. 08/929,877, now pending;

"METHOD AND APPARATUS FOR OPTIMIZING A MERGE-JOIN OPERATION ACROSS HETEROGENEOUS DATABASES", Inventor(s): Kleewein et al., U.S. Ser. No. 08/931,404, now pending;

"METHOD AND APPARATUS FOR CACHING RESULT SETS FROM QUERIES TO A REMOTE DATABASE IN A HETEROGENEOUS DATABASE SYSTEM", Inventor(s): Kleewein et al., U.S. Ser. No. 08/931,003, now pending;

"METHOD AND APPARATUS FOR DEFERRING LARGE OBJECT RETRIEVALS FROM A REMOTE DATABASE IN A HETEROGENEOUS DATABASE SYSTEM", Inventor(s): Kleewein et al., U.S. Ser. No. 08/929,642, now pending;

"HETEROGENEOUS DATABASE SYSTEM WITH DYNAMIC COMMIT PROCEDURE CONTROL", Inventor(s): Kleewein et al., U.S. Ser. No. 08/931,029, now pending.

FIELD OF THE INVENTION

This invention relates to an application program interface which provides transparent access to heterogeneous databases and, more particularly, to such an interface which provides improved efficiency data manipulations when accessing large object (LOB) data segments from a remote database.

BACKGROUND OF THE INVENTION

A continuing demand exists to couple multiple databases so as to enable transparent access to data stored therein. "Transparent" implies that an application program at a specific site is able to access data from all connected databases, without being aware of the origin of the data, nor of any incompatibilities which might exist between a local database and any of the plurality of coupled remote databases. It is to be understood that the terms "remote" and "local", as used herein, not only refer to physical locations, but also to databases that are located at a single site, but are controlled by different operating systems or database protocols.

In order to provide a transparent interface for heterogeneous databases, the prior art has employed one database as an interface and has enabled that interface, under control of a database management system (DBMS), to access data from other databases in accordance with data entries contained in an interface table.

Upon receiving a query from a query requester (e.g., an application program), the receiving DBMS performs a query optimization procedure to decide upon an efficient method for accessing the requested data. During such an optimization action, the specific data manipulation required to respond to the query is examined and various alternative methods for deriving a query response are evaluated. Various types of data manipulations are considered, with the one which is chosen being a perceived "best" in terms of processing efficiency and cost. Thereafter, a database query is prepared and dispatched to the remote database which contains a table or tables that contain the data which is necessary to respond to the application query. The data retrieved from the table(s), in answer to the database query, is termed the "result set". To prepare the result set, the required data manipulations may be performed at the remote database. Otherwise, the data manipulation(s) are performed by the local DBMS, based upon the received result set.

Relational DBMS's use SQL (structured query language) as a standard language for enabling database manipulations. The SQL language allows users to formulate relational operations on the database tables. For example, each SQL operator operates on either one or two tables and produces a new table as a result. SQL enables the linking together of information from multiple tables or views to perform complex sets of procedures.

Typically, a relational database stores a single data value entirely within a single storage unit whose size is prescribed by the database architecture. To provide greater limits on the data values stored, some relational database management systems include a specially defined datatype called a large object, generally referred to as a LOB. Recently, databases permit LOBs to have data sizes on the order of plural gigabytes ($10^6$ KB). Because of their size, transfers of LOB data values can require potentially many disk drive access operations that can significantly impede data manipulations and incur a severe performance penalty. Such a penalty exists even if a relatively minor change is made to a LOB. Currently, LOBs are experienced when full color image data is included as part of a database table.

The prior art has handled and manipulated LOBs using a technique called "deferred evaluation" that links data structures together. In deferred evaluation, the evaluation of predetermined string operators in an assignment statement is deferred until the entire assignment statement is received, rather than the more typical action of immediately executing string operators as they are encountered. Typically, a data structure is created for each operand of an assignment statement and includes a specification of what string operations are to be performed. The DBMS analyzes the data structures and the string operations and delays actually retrieving any data values from the data base until string operations have been simplified. That is, intermediate results are not written back to the database disk if they can be used for a next string operation. In such manner, disk access operations are reduced.

In U.S. Pat. No. 5,566,323 to Gainer et al., assigned to the same Assignee as this application, a relational DBMS is described which stores and retrieves LOBs. The Gainer et al. disclosed DBMS "mutates" selected string operations on LOBs into equivalent functions requiring reduced storage access operations. When a LOB is encountered, the DBMS first checks to determine if the statement can be "mutated". A "mutateable" statement is an assignment statement having at least one string operation and operands, such that the string operator can be changed or mutated into an equivalent function on a LOB operand that can be left in the database, thereby eliminating associated storage access operations. That is, the mutated function does not require that the LOB be read from the database into intermediate storage, but instead provides an equivalent string result by operating on the LOB, in place, in the database storage. The mutated statement is then processed according to the above-described deferred evaluation scheme.

When LOBs are encountered in heterogeneous database systems, transfers of LOBs from remote database tables are often required to respond to a query from an application program. Local storage of such LOB data can impose a significant processing cost on the heterogenous database system and is to be minimized, if at all possible.

Accordingly, it is an object of this invention to provide a method and apparatus for improving the efficiency of handling of LOB transfers in a heterogenous database system.

SUMMARY OF THE INVENTION

A method enables a computer to manipulate data from a table in a remote database in accord with a query request, wherein at least some data in the table includes large data objects (LOBs). The method includes the steps of: responding to the query requester by configuring a database query and determining (i) if a response to the database query requires transfer of LOB data from the table and if yes, and (ii) the LOB data can be transferred in response to the database query without a data manipulation which uses the LOB data or (iii) a data manipulation required in response to the database query which uses the LOB data can be performed at the remote database, then designating the LOB data for "streaming"; dispatching the database query to the remote database and receiving and storing a result set from the table from the remote database in response to the query; and causing any LOB data which forms a part of the result set and has been marked for streaming, to be dispatched to the query requester, without being written to disk.

DETAILED DESCRIPTION OF THE INVENTION

Figure 1:
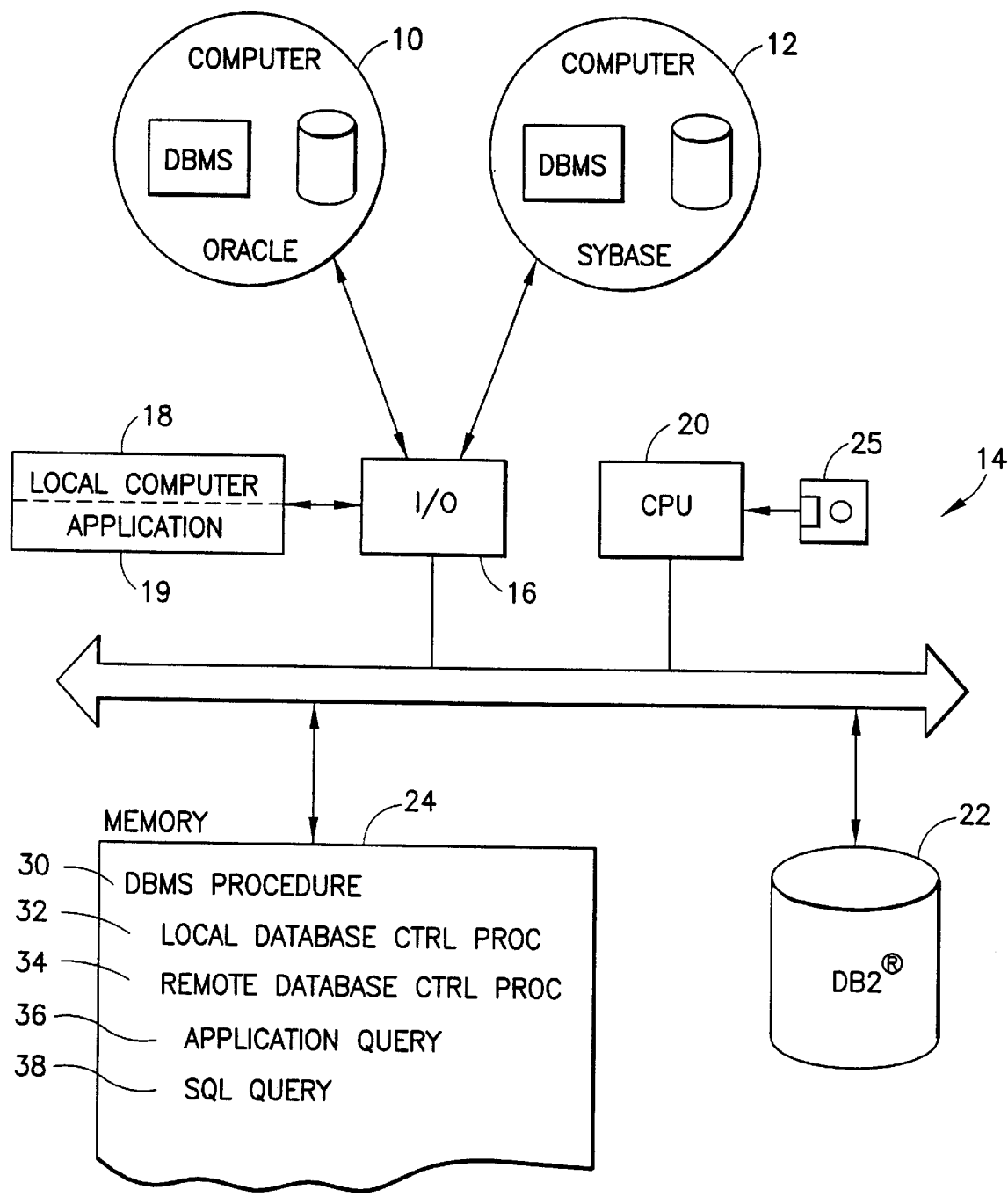
FIG. 1 is a high level block diagram of a database system which incorporates the invention.

Referring to FIG. 1, a heterogeneous database system includes, for example, three separate database management systems (DBMS's). A computer 10 includes an Oracle DBMS, a computer 12 includes a Sybase DBMS, and a computer/server 14 includes a DB2 DBMS. (Oracle is a trademark of the Oracle Corporation, Sybase is a trademark of the Sybase Corporation, and IBM and DB2 are trademarks of the International Business Machines Corporation). Computer/server 14 includes an input/output (I/O) module 16 which enables communication with computers 10 and 12 and various local computers 18, etc.

As will be hereafter understood, an application program 19 running on local computer 18 is able to access data from any connected database, whether the data is housed in computers 10, 12 or 14, and at all times it appears to application program 19 as though the data is coming from computer/server 14. A central processing unit (CPU) 20, a disk file 22 where the data comprising the DB2 database is stored and a memory 24 are all contained within computer/server. Within memory 24 are a plurality of procedures which provide overall control of the DB2 database and enable transparent access to and from the Oracle and Sybase databases in computers 10 and 12. Each of the aforesaid databases can be accessed by a standard data access language, such as SQL.

While the procedures to be considered below which enable implementation of the invention are shown in FIG. 1 as already loaded into memory 24, it is to be understood those procedures can be loaded into CPU 20 via a memory disk, tape or other storage device 25 in the well known manner. In any of these cases, the operation of CPU 20, in carrying out the functions of the invention, are controlled by the procedures and data stored in either memory 24 or storage device 25.

It is to be understood that the invention to be described below is applicable to many different types of data query actions, wherein a remotely located table is involved which includes LOB data. Thus, if a query from application program 29 includes a value which is to be used to access data from a remote table, and the data in the table includes one or more LOBs, transfer of the LOBs may be handled in accord with the invention. To illustrate the invention, an exemplary application program query will be described.

Memory 24 schematically illustrates some of the entries stored therein. DBMS procedure 30 includes local database control procedure 32 and remote database control procedure 34. Local database control procedure 32 is, for instance, responsive to a request from application program 19 running on local computer 18, to retrieve requested data from the DB2 database stored on disk file 22. Remote database control procedure 34 performs the same function, but with respect to the Oracle and Sybase databases contained on computers 10 and 12, respectively. In all cases, the functioning of procedures 32 and 34 are transparent to application program 19.

Memory 24 further includes a number of sub-procedures which are utilized to carry out the invention. In specific, remote database control procedure (hereafter RDCP) 34 stores an application query 36 received from application program 19. RDCP 34 further responds to receipt of application query 36 by establishing an SQL query 38 to a remote database wherein data is stored which is required to respond to application query 36.

As will be understood, a remote table required to be accessed in response to application query 36 may include a column or columns including LOBs. Such a fact can be determined by RDCP 34 inquiring into specification data contained in the DBMS which manages the table from which data will be accessed to respond to application query 36. If, during compile time, it is found that a column datatype specification is of a LOB category (e.g., data entries therein exceed a data size threshold value) and either (i) the LOB data can be transferred in response to an SQL-format query without a data manipulation which uses the LOB data or (ii) a data manipulation required in response to the SQL-format query (which uses the LOB data) can be performed by the DBMS which controls the remote database, then RDCP 34 marks the LOB data for "streaming". Thereafter, during run time, the thus marked LOB data is temporarily buffered in computer/server 14, without being written to disk and is then passed to Application program 19. Accordingly, disk accesses are avoided that would otherwise be required to record the LOB data to disk at computer/server 14.

Figure 2A:
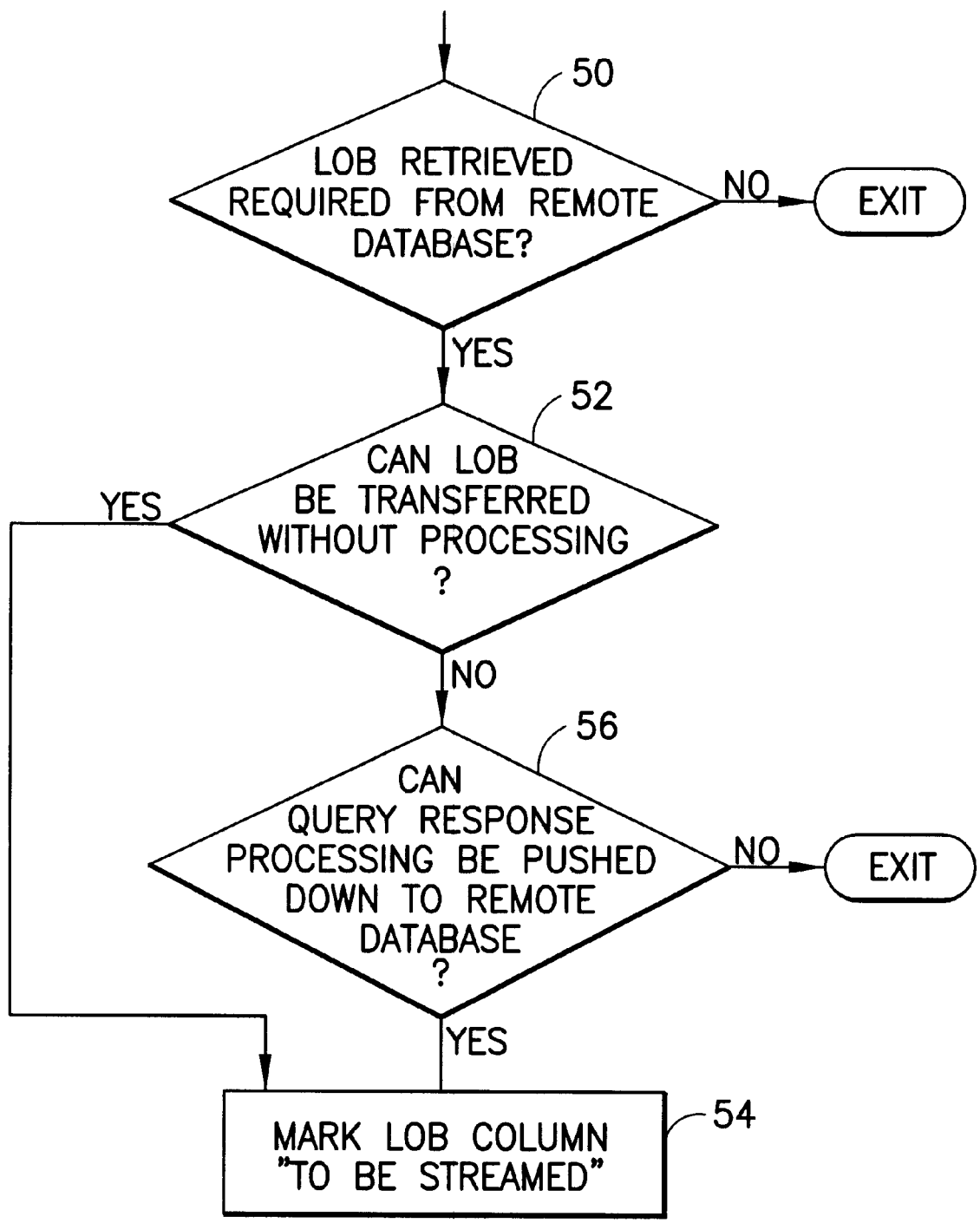
FIGS. 2A and 2B illustrate a logical flow diagram which describes the operation of the method of the invention.
Figures 2B, 3:
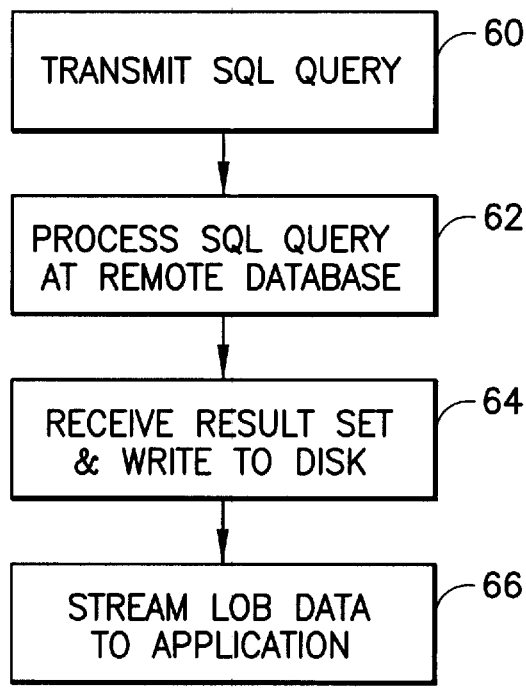
FIG. 3 illustrates a table in a remote database and is utilized as an example in describing the operation of the invention.

Referring now to FIGS. 2A and 2B, a high level logic flow diagram of the method of the invention will be considered, followed by a more detailed example. Initially, application query 36 is received from application program 19. In response, during compile time, RDCP 34 is caused to determine whether a remote table that is required to be accessed in response to application query 36 includes LOB data (decision box 50). This is accomplished by accessing and analyzing table specification data from the remote database which includes the table. If no LOB data is included, then the procedure exits. Otherwise, it is next determined if any processing is required which makes use of the LOB data at the remote database (decision box 52). If there is no such processing required, the column containing the LOB data is marked for "streaming" (box 54).

If it is determined that processing is required which makes use of the LOB data, then it is next determined if such processing can be "pushed down" and accomplished entirely at the remote database (decision box 56). If yes, the column containing the LOB data is marked for "streaming" (box 54). Otherwise, the procedure exits.

Thereafter, at run time, SQL query 38 is transmitted to the remote database (box 60) and any data manipulations required to develop a result set in response the query are performed thereat (box 62). The result set is then passed back to computer/server 14 and is written to disk, to be later processed and passed to application program 19 in response to application query 36 (box 64). However, as any LOB data is received which comprises a part of the result set, its "streaming" status is detected. As a result, the LOB data is temporarily buffered and is then passed to application program 19, without being written to disk (box 66). In effect, as blocks of the LOB data are received (e.g., in one megabyte "chunks"), the blocks are substantially immediately passed to the application program.

Turning now to FIG. 3, an example will further illustrate the method of the invention. Assume further that the table shown in FIG. 3, i.e., O_Employee, is stored in the Oracle database on computer 10. Assume that application/server 14 is required to access table values from computer 10 in response to an application query. Note that table O_Employee includes a picture column wherein each row thereof includes a LOB (e.g., a data size in excess of 32 KB, for instance). Further assume that application program 19 issues a query which results in the following SQL query being issued to the Oracle DBMS which controls the O_Employee table of FIG. 3:

Select picture,empNum from O_Employee where empName='Tom'

Accordingly, RDCP 34 during compile time and in response to the query, institutes an optimizing action which determines which data manipulation is most efficient in responding to the query. It further determines that the employee name and picture data is held in the O_Employee table in computer 10. RDCP 34 then accesses specification data from the Oracle DBMS and determines that a data column in the O_Employee table stores LOB data. The RDCP 34 optimizing action then determines if any processing is required which makes use of the LOB data in table O_Employee. If there is no such processing required, the column containing the LOB data is marked for streaming. If, however, it is determined that processing is required which makes use of the LOB data, then it is next determined if such processing can be pushed down to the Oracle DBMS. If yes, the column containing the LOB data is marked for streaming.

Assuming that a decision is made by the optimizing function that the data manipulation required to answer the query can be executed by the Oracle DBMS, (i.e., the table O_Employee rows can be accessed and compared with the predicate of the query in computer 10), the SQL query is dispatched to the Oracle DBMS. The predicate from the SQL query is then applied to the rows from table O_Employee by the Oracle DBMS and a result set comprising row #1 is derived. The result set comprising row #1 is then dispatched to computer/server 14 which, except for the LOB data, writes the result set to disk for later processing to produce an answer in response to the original application query. The LOB data is temporarily buffered in memory, but since the column containing the LOB data is marked for streaming, instead of the LOB data being written to disk, it is dispatched to application program 19 for storage, to await the later arriving answer to the query.

The result of the above operation is that the number of disk input/outputs is substantially reduced. Given the relatively large size of the LOBs, such processing savings can potentially be significant.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A method for enabling a computer to manipulate data from a table in a remote database in accord with a request from a query requestor, wherein at least some data in said table includes large data objects (LOBs), said method comprising the steps of:

a) responding to said query request by configuring a database query and (i) if a response to said database query requires transfer of LOB data from said table and if yes, and (ii) the LOB data can be transferred in response to the database query without a data manipulation which uses said LOB data, then designating the LOB data for "streaming";

b) dispatching said database query to said remote database and receiving a result set from said table from said remote database in response to said query; and c) storing said result set and causing any LOB data which has been marked for streaming to be then dispatched to said query requestor of said query request without being written to a non-volatile memory.

2. The method as recited in claim 1, wherein step a) further designates the LOB data for "streaming" if a data manipulation which is required to respond to said database query uses said LOB data, but said data manipulation can be performed at said remote database.

3. The method as recited in claim 2, wherein said LOB data is dispatched to said source of said query request, as portions thereof are received.

4. The method as recited in claim 2, wherein if step a) determines (i) that the LOB data cannot be transferred in response to the database query without a data manipulation which uses said LOB data or (ii) that a data manipulation required in response to said database query which uses said LOB data cannot be performed at said remote database, then said LOB data is written to non-volatile memory in association with said computer when received as part of a result set.

5. A memory media for controlling a computer to manipulate data from a table in a remote database in accord with a request from a query requestor, wherein at least some data in said table includes large data objects (LOBs), said memory media comprising:

a) means for controlling said computer to respond to said request by configuring a database query and (i) if a response to said database query requires transfer of LOB data from said table and if yes, and (ii) the LOB data can be transferred in response to the database query without a data manipulation which uses said LOB data, then designating the LOB data for "streaming";

b) means for controlling said computer to dispatch said database query to said remote database and to receive a result set from said table from said remote database in response to said database query; and c) means for controlling said computer to store said result set and to cause any LOB data which has been marked for streaming to be dispatched to said query requestor without being written to a non-volatile memory.

6. The memory media as recited in claim 5, wherein means step a) further controls said computer to designate the LOB data for "streaming" if a data manipulation which is required to respond to said database query uses said LOB data, but said data manipulation can be performed at said remote database.

7. The memory media as recited in claim 6, wherein said LOB data is dispatched to said query requestor as portions thereof are received.

8. The memory media as recited in claim 6, wherein if means a) controls said computer to determine (i) that the LOB data cannot be transferred in response to the database query without a data manipulation which uses said LOB data or (ii) that a data manipulation required in response to said database query which uses said LOB data cannot be performed at said remote database, then said computer is caused to write said LOB data non-volatile memory when received as part of a result set.

* * * * *